United States Patent [19]

Suganuma et al.

[11] Patent Number: 4,889,576
[45] Date of Patent: Dec. 26, 1989

[54] METHOD FOR JOINING SILICONE-COATED FABRICS

[75] Inventors: Noriyuki Suganuma; Hideo Shimmi, both of Chiba, Japan

[73] Assignee: Toray Silicone Company Limited, Tokyo, Japan

[21] Appl. No.: 909,645

[22] Filed: Sep. 22, 1986

[30] Foreign Application Priority Data

Nov. 10, 1985 [JP] Japan ................... 60-226582

[51] Int. Cl.$^4$ .............................. B32B 31/00
[52] U.S. Cl. .................... 156/249; 156/157; 156/182; 156/235; 156/306.9; 156/313; 156/329; 428/57; 428/246; 428/266
[58] Field of Search ............. 156/157, 249, 182, 313, 156/235, 329, 306.9; 428/57, 266, 246

[56] References Cited

U.S. PATENT DOCUMENTS

| 3,001,213 | 9/1961 | Stark et al. | 156/313 |
| 3,026,229 | 3/1962 | Wilcox | 156/306.6 |
| 4,569,870 | 2/1986 | Shinmi | 428/266 |

FOREIGN PATENT DOCUMENTS 2154682  5/1972  Fed. Rep. of Germany ...... 156/235

Primary Examiner—John J. Gallagher
Attorney, Agent, or Firm—Edward C. Elliott

[57] ABSTRACT

In the joining of silicone-coated fabrics in the present invention, a silicone rubber adhesive, which is plastic at room temperature and is an addition-curing type containing platinum-type catalyst or a radical-curing type containing organoperoxide, is inserted into the overlap region of said silicone rubber-coated fabrics. This overlap region is then hot-cured after press-adhering or is hot-cured while press-adhering. As a consequence, the silicone-coated fabrics are tightly bonded in an accurate, watertight and airtight manner.

7 Claims, No Drawings

METHOD FOR JOINING SILICONE-COATED FABRICS

BACKGROUND OF THE INVENTION

1. Field of the Invention

The present invention describes a method for joining silicone-coated fabrics by using a silicone rubber adhesive.

2. Background Information

Silicone-coated fabrics have been used as electric-insulating materials, diaphragms, waterproof fabrics, sputter-preventing fabrics, belts and fire curtains. There have been recent attempts to use such fabrics as a roofing material for stadiums, gymnasiums and outdoor restaurants.

Very large-area silicone-coated fabric is difficult to produce from the standpoint of production technology. When silicone-coated fabric is to be used as a roofing substitute for buildings or as a large-scale tent material, the silicone-coated fabric manufactured at the plant, which will have a relatively small area, must then be joined because a large area is required.

Heretofore, when fabrics were to be joined, in general they were overlapped and the overlap region was sewed.

A method of making a sewn seam in which a binding tape is adhesively applied over the line of stitching to give a water tight seam is taught in U.S. Pat. No. 2,372,632, issued Mar. 27, 1945 to Webb.

A method of sealing the holes caused by sewing together sheets of coated fabric is taught in U.S. Pat. No. 2,465,374, issued Mar. 29, 1949, to Haman, et al.

A sewn seam having the elastomeric component of one section bonded to an elastomeric component of another section is taught by Woodroof in U.S. Pat. No. 4,303,712, issued Dec. 1, 1981.

Also, a method has been proposed in which the joined body is acquired by coating an adhesive on the region of the silicone-coated fabric which is to participate in joining and by overlaying the coated surface. Adhesives to be used for this purpose are, for example, silicone pressure-sensitive adhesives and condensation-curable silicone adhesives in which a crosslinking agent has been added to a silicone pressure-sensitive adhesive (U.S. application Ser. No. 513,504, filed July 13, 1983, by Blizzard and Vanwert, now abandoned and U.S. application Ser. No. 694,481, filed Jan. 22, 1985, by Blizzard and Vanwert.

Also, the moisture-curing single-package silicone adhesive used as an adhesive for silicone rubber and described in U.S. application Ser. No. 694,481, filed Jan. 23, 1985, by Blizzard and Vanwert can also be considered an adhesive for joining silicone-coated fabric.

When a silicone-coated fabric which has been joined by sewing is used as a roofing material for a building or as a large-scale tent material, the tensile stresses caused by gravity and wind pressure are concentrated around the sewing thread and failure readily occurs in this vicinity. Rain and dust then penetrate the gap in this region of the joint.

On the other hand, the silicone pressure-sensitive adhesive and the adhesive of crosslinking agent added to silicone pressure-sensitive adhesive suffer from the following problems. After coating the adhesive, the solvent must be evaporated to produce a tacky film and the bonding strength after joining is unsatisfactory.

The moisture-curing single-package silicone adhesive does not provide an adequate initial bonding strength and the joint experiences slipping or peeling during the joining operation. Also, a long time is required to cure the adhesive layer completely.

In addition, since the above-mentioned adhesives are pastes or liquids, it is difficult to coat the adhesive on the surfaces to be joined and it is difficult to obtain a uniform coat thickness.

SUMMARY OF THE INVENTION

Silicone-coated fabrics are joined by overlapping the fabrics with the insertion at the overlap region of a silicone rubber adhesive which is plastic at room temperature. The joining is then by press-adhering and then hot-curing or by hot-curing during press-adhering. The silicone rubber adhesive is a radical curing type containing organic peroxide or an addition-curing type containing a platinum-type catalyst.

The goal of the present invention is to eliminate the above problems in the prior art by providing a method for precisely and strongly joining silicone-coated fabrics, in a watertight and airtight manner, and in which the joining operation is simple.

DESCRIPTION OF THE INVENTION

This invention is a method for joining silicone-coated fabrics, characterized by overlapping silicone-coated fabrics with the insertion at the overlap region of a silicone rubber adhesive which is plastic at room temperature and which is a radical-curing type containing organoperoxide, or an addition-curing type containing a platinum-type catalyst, followed by press-adhering and then by hot-curing, or by hot-curing during press-adhesion.

The invention will be explained. The silicone-coated fabric to be used in the present invention is not particularly restricted as long as a silicone rubber has been coated on and united with the fabric. The silicone rubber constituting said silicone-coated fabric is exemplified by organoperoxide-curing types, addition-curing types and condensation-curing types.

The fabric constituting said silicone-coated fabric includes weaves, knits, nonwovens, netting and their laminates. The fiber constituting this fabric includes inorganic fibers such as glass fiber, carbon fiber, silicon carbide fiber and stainless steel fiber; synthetic fibers such as nylon, polyethylene terephthalate, polyacrylonitrile and aromatic polyamides; semisynthetic fibers such as acetate and rayon and natural fibers such as cotton and flax. Glass fiber and transparent synthetic fibers are preferred from the standpoint of light transmission and inorganic fibers are preferred from the standpoint of weather resistance. The shape, thickness and size of the silicone-coated fabric are not particularly restricted.

The silicone-coated fabric can be manufactured by coating the silicone rubber composition by calendering, knife coating or dip coating and by then curing by heating or standing at room temperature. Also, the silicone-coated fabric includes those in which a thin layer of silicone resin has been laminated on and united with the silicone rubber surface.

Addition-curing silicone rubber adhesives which contain a platinum-type catalyst and which are plastic at room temperature are typically exemplified by compositions principally composed of diorganopolysiloxane gum having silicon-bonded alkenyl groups, organohydrogenpolysiloxane, a platinum-type catalyst and reinforcing filler. Additional components are 1 or more materials selected from among extending fillers, addition-reaction retarders, thermal stabilizers, flame retardants, colorants, etc.

Examples of the diorganopolysiloxane gum having silicon-bonded alkenyl groups are
dimethylvinylsiloxy-terminated dimethylpolysiloxane gums,
dimethylallylsiloxy-terminated dimethylpolysiloxane gums,
phenylmethylvinylsiloxy-terminated diphenylsiloxane-dimethylsiloxane copolymer gums,
dimethylvinylsiloxy-terminated methylvinylsiloxane-dimethylsiloxane copolymer gums and
silanol-terminated methylvinylsiloxane-dimethylsiloxane copolymer gums.

Examples of the organohydrogenpolysiloxanes are
trimethylsiloxy-terminated methylhydrogenpolysiloxanes,
trimethylsiloxy-terminated dimethylsiloxane-methylhydrogensiloxane copolymers,
dimethylphenylsiloxy-terminated methylphenylsiloxanemethylhydrogensiloxane copolymers,
cyclic methylhydrogenpolysiloxanes and copolymers composed of dimethylhydrogensiloxy units and $SiO_{4/2}$ units.

Examples of the platinum-type catalysts are platinum black, chloroplatinic acid, platinum tetrachloride, chloroplatinic acid-olefin complexes, chloroplatinic acid-methylvinylsiloxane complexes, rhodium compounds and palladium compounds.

Examples of reinforcing fillers are dry-method silica wet-method silica, these silicas which have been hydrophobicized with organohalosilane or organosilazane, etc., and carbon black.

Typical examples of organoperoxide-containing, radical-curing silicone rubber adhesives which are plastic at room temperature are compositions principally composed of diorganopolysiloxane gum, organoperoxide and reinforcing filler. Additional components are 1 or more materials selected from among extending fillers, thermal stabilizers, flame retardants, colorants, etc.

Examples of the diorganopolysiloxane gums are gums in which a dimethylpolysiloxane main chain, or a main chain of dimethylsiloxane-methylphenylsiloxane copolymer or dimethylsiloxane-diphenylsiloxane copolymer or dimethylsiloxanemethylvinylsiloxane copolymer, is terminated by trimethylsiloxy, dimethylvinylsiloxy, methylphenylvinylsiloxy or silanol groups.

Examples of the organoperoxides are benzoyl peroxide, p-chlorobenzoyl peroxide, di-t-butylperoxide, 2,5-dimethyl-2,5-di(t-butylperoxy)hexane and dicumyl peroxide.

Examples of the reinforcing fillers are the same as given above.

The silicone rubber adhesive is to be plastic at room temperature and the plasticity, as obtained by JIS C2123 using a Williams Plastometer, is preferably between 170 and 600 and more preferably between 200 and 400. The form of the silicone rubber adhesive is not particularly restricted, but a sheet molding is preferred because the thickness of the adhesive layer after joining will then be uniform and the bonding strength will also be uniform. The silicone rubber adhesive sheet must be sufficiently thick to eliminate irregularities in the surface of the silicone-coated fabric. When too thin, the sheet of silicone rubber adhesive will be difficult to handle during the joining operation and the thickness is therefore preferably equal to or greater than 0.1 mm. When the adhesive layer is too thick, stress is concentrated at the adhesion interface when stress is applied to the joint and the bonding strength is reduced and the creep becomes large. Due to this, the thickness is preferably less than 5.0 mm.

By laminating the silicone rubber adhesive sheet on a strip of release paper or film, it will then be easily handled and its bonding width will be uniform, which improve joining workability and joining accuracy. This is accordingly preferred. Since it may be difficult to handle the silicone rubber adhesive sheet proper due to stretching or tearing, it is preferably reinforced with a fabric core. Fabrics suitable for reinforcing the silicone rubber adhesive sheet are the same as those which may constitute the silicone-coated fabric, but are preferably thinner. Fabric-reinforced silicone rubber adhesive sheet can be easily manufactured by laminating the silicone rubber composition on both surfaces of the fabric using a calender.

To bond silicone-coated fabrics using the silicone rubber adhesive, the silicone-coated fabrics are overlapped with the silicone rubber adhesive being inserted at said overlap region. This is then press-adhered and then heated in order to cure the silicone rubber adhesive or, alternatively, the overlap region is heated while press-adhered. The edges of adjacent silicone-coated fabric piece goods may be joined and this process repeated in order to manufacture a silicone-coated fabric with a larger area. Then, the silicone-coated fabrics manufactured by joining several silicone-coated fabrics are themselves joined. Alternatively, the silicone-coated fabric piece good is wound on an iron column and bonded at its outer edge with another piece good on that side of the iron column. Also, sheets of the silicone-coated fabric may be wound up on cylinders and their respective edges may then be bonded. The features of joining are appropriately selected according to the purpose of joining and the shape, size and weight required by the application of the silicone-coated fabric.

The overlap region width of the silicone-coated fabric is not particularly restricted, but the bonding strength will be low when this width is too narrow. Accordingly, this width is preferably at least 1 cm.

The silicone rubber adhesive can be inserted at the overlap region of the silicone-coated fabrics, for example, as follows.

(1) A sheet of the silicone rubber adhesive is placed on the joint region of one sheet of the silicone-coated fabric and another sheet of silicone-coated fabric is then laid on the silicone rubber adhesive.

(2) The silicone rubber adhesive, laminated in a prescribed thickness on a strip of release paper or film, is placed on the joint region of one sheet of silicone-coated fabric in such a way that the layer of silicone rubber adhesive is brought into contact with the silicone-coated fabric. The overlap region is then pressed with a hand roll, etc., and the release paper or film is subsequently peeled off. Another sheet of silicone-coated fabric is then overlaid on the deposited silicone rubber adhesive.

(3) A sheet of the silicone rubber adhesive, reinforced with a fabric core, is placed on the joint region of one sheet of silicone-coated fabric and another sheet of silicone-coated fabric is then overlaid on the silicone rubber adhesive sheet.

Of these methods, methods (2) and (3) are preferred from the standpoints of ease of operation and bonding accuracy.

After the silicone rubber adhesive has been inserted in the overlap region of the silicone-coated fabrics, the overlap region is then pressed with a hand roll, etc., in order to bond the silicone-coated fabrics by virtue of the tack strength of the silicone rubber adhesive.

This tack strength will be large enough to resist the tensile stresses on the joint during the joining operation.

The overlap region is then placed between hot plates or treated with a hot iron in order to cure said silicone rubber adhesive, with the result that the silicone-coated fabrics are tightly bonded and united in an airtight and watertight manner. Or, the silicone rubber adhesive is inserted in the overlap region of the silicone-coated fabrics and the overlap region is then put between hot plates and subsequently pressed, or the overlap region is pressed with a hot iron, in order to cure said silicone rubber adhesive and so tightly bond and unite the silicone-coated fabrics in a watertight and airtight manner.

The heating temperature and heating time cannot be unconditionally specified because they depend on the curing characteristics and thickness of the silicone rubber adhesive and on the thickness and heat transfer properties of the silicone-coated fabric. However, normal curing conditions are about 80 to 300° C. for 30 minutes to 20 seconds, taking into consideration workability of the process and fabric heat resistance.

Accordingly, the joining method of the present invention is useful not only for joining silicone-coated fabrics on the spot at the manufacturing facility, but also for joining said fabric at the construction site for the purpose of producing a large-scale tent material or a substitute material for a building roof or wall.

The present invention will be explained using examples of execution. "Part" in the examples means "weight part". The plasticity is the value measured with a Williams Plastometer by JIS-C2123 (ASTM D926). The viscosity and plasticity are measured at 25° C. The tensile strength of the joined material is measured at 25° C. by the method of JIS-L1096 (ASTM D412).

EXAMPLE 1

100 Parts dimethylvinylsiloxy-terminated dimethylpolysiloxane with a viscosity of 2.0 Pa.s was mixed to homogeneity with 3.0 parts trimethylsiloxy-terminated dimethylsiloxane-methylhydrogensiloxane copolymer with a viscosity of 0.02 Pa.s, 0.30 parts chloroplatinic acid-tetramethyldivinylsiloxane complex (platinum content, 0.5 weight percent) 15 parts hexamethyldisilazane-hydrophobicized dry-method silica with a specific surface area of 200 m$^2$/g, and 0.50 parts methylbutynol. The produced silicone rubber composition was coated on both surfaces of a glass cloth (plain weave; count, 24×19/25 mm; weight, 490 g/m$^2$; thickness, 0.50 mm) by knife coating and this was then cured at 170° C. for 5 minutes. The resulting silicone rubber-coated glass cloth weighed 830 g/m$^2$ and was 0.80 mm thick.

Next, 90 parts of dimethylvinylsiloxy-terminated dimethylpolysiloxane gum was mixed to homogeneity with 10 parts dimethylvinylsiloxy-terminated methylvinylsiloxane-dimethylsiloxane copolymer gum (methylvinylsiloxane unit content, 2.5 mol percent), 40 parts hexamethyldisilazane-hydrophobicized dry-method silica with a specific area of 300 m$^2$/g, 1.0 part trimethylsiloxy-terminated methylhydrogenpolysiloxane with a viscosity of 0.03 Pa.s, 0.2 parts chlorollatinic acid-tetramethyldivinylsiloxane complex (platinum content, 0.5 weight percent) and 0.1 part phenylbutynol to produce a silicone rubber adhesive with a plasticity of 250. The resulting silicone rubber adhesive was laminated in a thickness of 0.50 mm on a polyethylene film using a calender, cut into a 3 cm-wide tape and then applied to the 3 cm-wide strip running along the edge of the above silicone rubber-coated glass cloth. After peeling off the film, the adhesion was overlapped with the edge (3 cm width) of another silicone rubber-coated glass cloth. The overlap region (3 cm width) was pressed using a hand roll which applied a load of 2 kg per 5 cm width in order to bond the edges of the silicone rubber-coated fabrics. The tensile strength was measured, placing this bonded region in the middle, and was found to be 11 kg/3 cm. When the silicone rubber-coated glass cloth was manually pulled sideways, the bonding region does not slip or peel.

Other samples were inserted and left between hot plates at 180° C. for 10 minutes in order to cure the silicone rubber adhesive. The fabrics were tightly bonded to each other and the tensile strength was measured at 360 kg/3 cm. The failure mode was a combination of cohesive rupture of the silicone rubber adhesive layer with adhesive rupture at the silicone rubber-coated cloth. Silicone rubber-coated fabrics were also joined by the method described above with the exception that the width of the silicone rubber adhesive sheet was 5 cm and the width of the bonding region was thus 5 cm. It was the silicone rubber-coated fabric which tore in the measurement of tensile strength, at this seam width.

EXAMPLE 2

The silicone rubber adhesive described in Example 1 was coated on both surfaces of a glass cloth (plain weave; count 20×10/25 mm; weight, 55 g/m$^2$; thickness, 0.09 mm) using a calender in order to manufacture a 0.65 mm-thick sheet which was then cut into a 5 cm-wide tape.

This silicone rubber adhesive tape was placed on the 5 cm-wide strip running along the edge of a silicone rubber-coated glass cloth as described in Example 1. This was overlapped with 5 cm-wide strip running along the edge of another sheet of the silicone rubber-coated glass cloth of Example 1 and this was then press-adhered as described in Example 1. The pre-cure tensile strength was measured as described in Example 1 at 15 kg/3 cm. The silicone rubber adhesive was hot-cured as described in Example 1. It was found that the silicone rubber-coated glass cloths were tightly bonded to each other and the tensile strength was 400 kg/3 cm. The failure mode was a combination of cohesive rupture of the silicone rubber adhesive layer with adhesive rupture in the silicone rubber-coated cloth. Also, the silicone rubber-coated glass cloths were well bonded to each other even before curing by heating: when the silicone rubber-coated cloth was manually pulled sideways, the bonding region did not slip or peel.

EXAMPLE 3

A liquid silicone resin composition was prepared from 60 parts dimethylvinylsiloxy-terminated dimethylpolysiloxane with a viscosity of 2.0 Pa.s, 25 parts copolymer with a 65 mole percent dimethylvinylsiloxy unit content and composed of SiO$_{4/2}$ units and dimethylvinylsiloxy units, 15 parts trimethylsiloxy-terminated methylhydrogenpolysiloxane with a viscosity of 0.020 Pa.s, 0.2 parts chloroplatinic acid-tetramethyldivinylsiloxane complex (platinum content, 0.5 weight percent) and 0.05 parts phenylbutynol. This was coated to a thickness of 50 μm on both surfaces of the silicone rubber-coated glass cloth described in Example 1. This was then cured at 170° C. for 5 minutes to manufacture a silicone-coated glass cloth.

The 3 cm-wide tape of silicone rubber adhesive described in Example 1 was applied on a 3 cm-wide strip running along the edge of the above silicone-coated glass cloth. After the film was peeled off, a 3 cm-wide strip running along the edge of another silicone-coated glass cloth, of the same type as above, was overlaid on the adhesive. The overlap region was then pressed with a hand roll as described in Example 1 in order to adhere the above-mentioned edges to each other. The tensile strength before curing was measured at 10 kg/3 cm. The silicone rubber adhesive was then cured at 180° C. for 10 minutes to bond the silicone-coated glass cloths tightly to each other. The tensile strength was 290 kg/3 cm. The failure mode was a combination of cohesive rupture of the silicone rubber adhesive layer with adhesive rupture at the silicone-coated cloth.

EXAMPLE 4

A silicone rubber composition was prepared when 100 Parts dimethylvinylsiloxy-terminated dimethylsiloxanemethylvinylsiloxane copolymer gum with a 0.14 mol percent methylvinylsiloxane unit content was kneaded to homogeneity with 40 parts wet-method silica with a specific surface area of 230 m$^2$/g, and then combined and kneaded to homogeneity with 1.5 parts 2,4-dichlorobenzoyl peroxide (50 weight percent purity). The resulting silicone rubber composition was coated on both surfaces of the glass cloth described in Example 1 by calendering, and this was then vulcanized at 170° C. for 5 minutes. The weight of the produced silicone rubber-coated glass cloth was 900 g/m$^2$ and the thickness was 0.85 mm.

Next, 100 parts of dimethylvinylsiloxy-terminated dimethylsiloxane-methylvinylsiloxane copolymer gum, with a methylvinylsiloxane unit content of 0.20 mol percent, was kneaded to homogeneity with 50 parts hexamethyldisilazanehydrophobicized dry-method silica with a specific surface area of 300 m$^2$/g, and 1.5 parts 2,4-dichlorobenzoyl peroxide (50 weight percent purity) in order to produce a silicone rubber adhesive with a plasticity of 280.

This silicone rubber adhesive was then molded into a 0.60 mm-thick sheet which was subsequently cut into a 5 cm-wide tape. This was inserted into the overlap region (5 cm wide) along the edges of two sheets of the above silicone-rubber coated glass cloth. The tensile strength, measured before heat-curing by the method of Example 1, was 18 kg/3 cm. The silicone rubber-coated fabrics was tightly bonded to each other before hot curing: when the silicone rubber-coated fabric was manually pulled sideways; the bonding region did not slip or peel off. Bonding after hot-curing was tight.

EXAMPLE 5

The tape of silicone rubber adhesive described in Example 1 was applied to a 3 cm-wide strip running along the edge of the silicone rubber-coated glass cloth described in Example 4. After the polyethylene film had been peeled off, a 3 cm-wide strip running along the edge of another piece of the silicone rubber-coated glass cloth as described in Example 4 was overlaid on the silicone rubber adhesive. The overlap region was pressed between hot plates at 180° C. for 5 minutes in order to cure the silicone rubber adhesive composition. The tensile strength of the joined silicone rubber-coated glass fabric was 340 kg/3 cm. The failure mode was a combination of cohesive rupture of the silicone rubber adhesive layer with adhesive rupture at the silicone rubber-coated cloth.

EXAMPLE 6

A joining test was conducted on silicone rubber-coated weaves under the conditions described in Example 1 with the exception that a polyethylene terephthalate fabric (plain weave; count, 41×37/25 mm; weight, 538 g/m$^2$; thickness, 0.66 mm) was used instead of the glass cloth. The results are the same as in Example 1. After hot-curing, it was the silicone rubber-coated fabric which tore for both bonding widths of 3 cm and 5 cm.

COMPARISON EXAMPLE 1

A single-package room temperature-curable silicone rubber adhesive paste (SH780 from Toray Silicone Co., Ltd.) was coated in a thickness of approximately 0.50 mm on a 5 cm-wide strip running along the edge of one of 2 sheets of the silicone rubber-coated glass cloth of Example 1. The 5 cm-wide strip running along the edge of the other sheet of silicone rubber-coated glass cloth was then overlaid on the adhesive. The overlap regions were bonded by pressing with a hand roll which applied a load of 2 kg per 5 cm width. When the attempt was made to measure the tensile strength, it could not be measured because of ready failure of the adhesive layer. The overlap regions of the remaining samples were allowed to stand at room temperature under a load. The tensile strength was measured as 130 kg/3 cm after 1 day and 190 kg/3 cm after 3 days. All samples presented a combination of cohesive rupture of the adhesive layer with adhesive rupture.

COMPARISON EXAMPLE 2

An experiment was conducted by the method described in Comparison Example 1 with the exceptions that a silicone pressure-sensitive adhesive (SH 4280 from Toray Silicone Co., Ltd.) was used instead of the silicone rubber adhesive used in Comparison Example 1; and the test specimens were allowed to stand for 1 hour after coating of the adhesive. The fabrics were bonded to each other, and the tensile strength was 12 kg/cm.

COMPARISON EXAMPLE 3

An adhesive prepared from 100 parts of a silicone pressure-sensitive adhesive (SH 4280 from Toray Silicone Co., Ltd.), 2 parts trimethylsiloxy-terminated methylhydrogenpolysiloxane with a viscosity of 0.03 Pa.s and 0.5 parts dibutyltin diacetate was coated in a thickness of 0.60 mm on a 5 cm-wide strip running along the edge of one of 2 sheets of the silicone rubber-coated glass cloth of Example 4. This was then air-dried at room temperature for 1 hour until the solvent in the adhesive had evaporated. This was then overlaid with a 5 cm-wide strip running along the edge of the other sheet of silicone rubber-coated glass cloth. The overlap regions were pressed with a hand roll which applied a load of 2 kg per 5 cm width in order to bond the overlap regions. The tensile strength before curing was measured by the method described in Example 1 and was found to be 18 kg/3 cm. Half of the remaining samples were allowed to stand at room temperature. The tensile strength was measured as 95 kg/3 cm after 3 days and 160 kg/3 cm after 7 days. All specimens presented a combination of cohesive rupture of the adhesive layer with adhesive rupture. An attempt was made to cure the rest of the samples by heating, but the adhesive layer underwent foaming at 150° C. and so could not be subjected to an accelerated curing.

That which is claimed is:

1. Method for joining silicon rubber-coated fabrics, characterized by overlapping silicone rubber-coated fabrics with the insertion at the overlap region of a silicone rubber adhesive which is plastic at room temperature and which is a radical-curing type containing organoperoxide, or an addition-curing type containing a platinum-type catalyst, followed by press-adhering and then by hot-curing, or by hot-curing during press-adhesion.

2. Joining method of claim 1 wherein the silicone rubber adhesive is a sheet from 0.1 to 5.0 mm thick.

3. Joining method of claim 2 wherein the silicone rubber adhesive sheet has a fabric core.

4. Joining method of claim 2 wherein the silicone rubber adhesive sheet is laminated on a release film.

5. Joining method of claim 1 wherein the silicone rubber adhesive has a Williams Plasticity of from 170 to 600.

6. Joining method of claim 1 wherein the silicone rubber adhesive is an addition-curing type containing a platinum-type catalyst, diorganosiloxane gum having silicon-bonded alkenyl groups, organohydrogenpolysiloxane, and reinforcing filler said adhesive having a Williams plasticity of from 200 to 400.

7. Joining method of claim 5 wherein the silicone rubber adhesive is first laminated in a thickness of from 0.1 mm to 5.0 mm on a release film for ease of placement at the overlap region.

* * * * *